United States Patent
Jeong et al.

(10) Patent No.: US 10,183,428 B2
(45) Date of Patent: Jan. 22, 2019

(54) UNIT CELL INJECTION MOLD FOR FUEL CELL

(71) Applicant: HYUNDAI MOTOR COMPANY, Seoul (KR)

(72) Inventors: Byeong-Heon Jeong, Seongnam-si (KR); Han Ki Sung, Ulsan (KR); Jong Kil Oh, Yongin-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 172 days.

(21) Appl. No.: 15/197,128

(22) Filed: Jun. 29, 2016

(65) Prior Publication Data
US 2017/0173833 A1 Jun. 22, 2017

(30) Foreign Application Priority Data
Dec. 16, 2015 (KR) .................. 10-2015-0179979

(51) Int. Cl.
*B29C 45/14* (2006.01)
*H01M 2/14* (2006.01)
(Continued)

(52) U.S. Cl.
CPC .. *B29C 45/14065* (2013.01); *B29C 45/14418* (2013.01); *H01M 2/145* (2013.01);
(Continued)

(58) Field of Classification Search
CPC ........ B29C 45/14065; B29C 45/14418; B29C 45/14836; B29C 2045/14122;
(Continued)

(56) References Cited

U.S. PATENT DOCUMENTS

2006/0237870 A1  10/2006  Bordeaux et al.
2008/0116609 A1  5/2008  Darke
(Continued)

FOREIGN PATENT DOCUMENTS

JP  S64-34714 A  2/1989
JP  H05-285991 A  11/1993
(Continued)

OTHER PUBLICATIONS

Korean Notice of Allowance issued in corresponding Korean Patent Application No. 10-2015-0179979, dated Oct. 25, 2017, with English Translation.
Korean Office Action dated Apr. 14, 2017 issued in Korean Patent Application No. 10-2015-0179979.

*Primary Examiner* — Joseph S Del Sole
*Assistant Examiner* — Mohamed K Ahmed Ali
(74) *Attorney, Agent, or Firm* — McDermott Will & Emery LLP

(57) ABSTRACT

A unit cell injection mold for fabricating a unit cell of a fuel cell, in which an integrated frame of the unit cell formed by injecting a polymer resin onto an insert, in which a membrane electrode assembly and a gas diffusion layer are integrated, is formed, the unit cell injection mold includes an upper mold, a lower mold engaged with the upper mold to define an inner space between the lower mold and the upper mold, the inner space including an injection area into which the insert is accommodated and an insert area into which the polymer resin is injected to form the frame, and elastic protrusions formed from an elastic material, the elastic protrusions being disposed on the upper mold and the lower mold to face each other, wherein the elastic protrusions clamp the insert to divide the inner space into the insert area and the injection area to prevent the polymer resin from entering the insert area.

9 Claims, 4 Drawing Sheets

(51) Int. Cl.
  *H01M 8/0245* (2016.01)
  *H01M 8/1004* (2016.01)
  *B29L 31/34* (2006.01)

(52) U.S. Cl.
  CPC ....... *H01M 8/0245* (2013.01); *H01M 8/1004* (2013.01); *B29C 45/14836* (2013.01); *B29C 2045/14122* (2013.01); *B29K 2821/00* (2013.01); *B29K 2995/007* (2013.01); *B29K 2995/0013* (2013.01); *B29K 2995/0016* (2013.01); *B29L 2031/3468* (2013.01)

(58) Field of Classification Search
  CPC .. H01M 8/1004; H01M 2/145; H01M 8/0245; H01M 8/0273; H01M 8/0271; H01M 8/0276; H01M 2008/1095
  See application file for complete search history.

(56) References Cited

U.S. PATENT DOCUMENTS

| | | | | |
|---|---|---|---|---|
| 2009/0197146 | A1* | 8/2009 | Nonogaki | B29C 45/14065 429/508 |
| 2009/0233131 | A1* | 9/2009 | Morimoto | B29C 45/14336 429/494 |
| 2009/0286121 | A1* | 11/2009 | Morimoto | H01M 8/0273 429/494 |

FOREIGN PATENT DOCUMENTS

| | | |
|---|---|---|
| JP | 07-16870 A | 1/1995 |
| KR | 10-2006-0038390 A | 5/2006 |
| KR | 10-2008-0109848 A | 12/2008 |
| KR | 10-1491369 B1 | 2/2015 |

* cited by examiner

300(310,320)

UNIT CELL INJECTION MOLD FOR FUEL CELL

CROSS REFERENCE TO RELATED APPLICATION

The present application claims the benefit of priority to Korean Patent Application No. 10-2015-0179979, filed Dec. 16, 2015 with the Korean Intellectual Property Office, the entire contents of which is incorporated herein for all purposes by this reference.

TECHNICAL FIELD

The present disclosure generally relates to a unit cell injection mold for a fuel cell. More particularly, the present disclosure relates to a unit cell injection mold for a fuel cell, the injection mold being able to form a frame while minimizing damage to an insert into which a gas diffusion layer (GDL) and a membrane electrode assembly (MEA) are integrated.

BACKGROUND

In general, a fuel cell is a system producing electricity from a chemical reaction of hydrogen and oxygen, as a reverse reaction of an electrolysis reaction of water. The fuel cell is regarded as a highly-efficient and clean energy source, and the use thereof is gradually increasing.

In particular, polymer electrolyte membrane fuel cells (PEMFCs) are operable in a relatively-low temperature and have rapid start and response characteristics, and thus developments thereof for a mobile power source of vehicles are actively being undertaken.

A stack of such a PEMFC is formed by stacking a desirable number of unit cells. Each of the unit cells may include: a membrane electrode assembly (MEA) including an anode, a cathode, and a polymer electrolyte membrane between the anode and the cathode; a gas diffusion layer (GDL); a metal-made separator referred to as a bipolar plate; and a gasket.

Since a single unit cell of a hydrogen-oxygen reaction fuel cell can generate up to about 1.2 volts at an operating temperature of 100° C. or below, a single fuel cell is constructed by stacking a plurality of unit cells in series such that an amount of current required for driving a vehicle can be produced.

FIG. 1 is a view illustrating a unit cell of a fuel cell of the related art fabricated by integrating an MEA and a GDL, and FIG. 2 is a view illustrating a unit cell injection mold for a fuel cell of the related art.

As illustrated in FIGS. 1 and 2, in the related art, a process of fabricating unit cells each having a polymer frame 20 by integrating an MEA and a GDL using a polymer resin 30 in an injection mold was developed.

Here, the injection mold of the related art may include an upper mold 101 having a protrusion 301 and a lower mold 201 having a protrusion 301 facing the protrusion 301 of the upper mold 101. The opposing protrusions 301 of the upper and lower molds 101 and 201 prevent the polymer resin 30 from permeating into an insert 10 in which the MEA and the GDL are integrated.

The above-mentioned protrusions 301 can effectively prevent the polymer resin 30 from permeating into the insert 10 even in a condition in which the pressure of injection is excessive, since the protrusions 301 are formed from the same metallic material as the upper mold 101 and the lower mold 201. However, the insert 10 may be damaged, for example, fractured or cut, by the protrusions 301 formed from the metallic material, since the insert 10 is formed from a relatively softer and smoother material than the metallic material. This increases a defect rate of products, which is problematic.

The foregoing is intended merely to aid in the understanding of the background of the present disclosure, and is not intended to mean that the present disclosure falls within the purview of the related art that is already known to those skilled in the art.

SUMMARY OF THE DISCLOSURE

Accordingly, the present disclosure has been made keeping in mind the above problems occurring in the related art, and the present disclosure is intended to propose a unit cell injection mold for a fuel cell, the injection mold being able to prevent polymer resin from permeating into an insert, in which a membrane electrode assembly (MEA) and a gas diffusion layer (GDL) are integrated, while preventing damage to the insert.

Also proposed is a unit cell injection mold for a fuel cell, the injection mold being able to minimize damage to the insert, thereby improving the marketability and durability of a fuel cell stack in which produced unit cells are stacked on one another.

In order to achieve the above object, according to one aspect of the present disclosure, there is provided a unit cell injection mold for fabricating a unit cell of a fuel cell, in which an integrated frame of the unit cell formed by injecting a polymer resin onto an insert, in which a membrane electrode assembly and a gas diffusion layer are integrated, is formed. The unit cell injection mold includes: an upper mold; a lower mold engaged with the upper mold to define an inner space between the lower mold and the upper mold, the inner space including an injection area into which the insert is accommodated and an insert area into which the polymer resin is injected to form the frame; and elastic protrusions famed from an elastic material, the elastic protrusions being disposed on the upper mold and the lower mold to face each other, wherein the elastic protrusions clamp the insert to divide the inner space into the insert area and the injection area to prevent the polymer resin from entering the insert area.

The elastic protrusions may include: an upper elastic protrusion fixed to the upper mold to be positioned between the insert area and the injection area; and a lower elastic protrusion fixed to the lower mold to face the upper elastic protrusion.

The upper elastic protrusion and the lower elastic protrusion may be configured such that the distance therebetween gradually decreases in the direction from the injection area toward the insert area.

Each of the upper elastic protrusion and the lower elastic protrusion may have a convex-concave structure on a surface thereof that contacts against the insert.

The unit cell injection mold may further include a pair of protective pads attached to the surface of the upper elastic protrusion and the surface of the lower elastic protrusion that contact against the insert.

The upper elastic protrusion and the lower elastic protrusion may be formed from a rubber material, the heat resistance of which is greater than that of the protective pads, and the thermal conductivity of which is lower than that of the protective pads.

The upper elastic protrusion, the lower elastic protrusion, and the protective pads may be foisted from a rubber material, with the rubber material of the upper elastic protrusion and the lower elastic protrusion having a higher degree of hardness than the rubber material of the protective pads.

The upper mold and the lower mold may further include an upper protrusion and a lower protrusion between the insert area and the injection area, the upper protrusion facing the lower protrusion. The upper elastic protrusion and the lower elastic protrusion may be attached to the upper mold and the lower mold to surround the upper protrusion and the lower protrusion.

The upper elastic protrusion and the lower elastic protrusion in the elastic protrusions may have different shapes.

The thickness of the insert area may be greater than the thickness of the insert such that neither the upper mold nor the lower mold contact against the insert.

According to embodiments of the present disclosure, the protrusions are formed from an elastic material. It is thereby possible to minimize damage to the insert during injection molding of a unit cell of a fuel cell, thereby minimizing defects in a unit cell product.

In addition, it is possible to minimize the contact of the insert with either the upper mold or the lower mold, thereby preventing the insert from being damaged by heat of either the upper mold or the lower mold.

Accordingly, it is possible to improve the marketability and durability of a fuel cell stack fabricated by stacking unit cells on one another, the unit cells being fabricated using the unit cell injection mold for a fuel cell according to embodiments of the present disclosure.

BRIEF DESCRIPTION OF THE DRAWINGS

The above and other objects, features and advantages of the present disclosure will be more clearly understood from the following detailed description when taken in conjunction with the accompanying drawings, in which.

DETAILED DESCRIPTION

The terminologies used herein are for the purpose of describing particular aspects (or embodiments) only and are not intended to be limiting of the present disclosure. As used herein, the singular forms are intended to include the plural forms as well, unless the context clearly indicates otherwise. It will be further understood that the terms "comprise" and derivatives thereof, when used herein, specify the presence of stated features, ranges, integers, steps, operations, elements, and/or components, but do not preclude the presence or addition of one or more other features, ranges, integers, steps, operations, elements, components, and/or groups thereof.

Unless otherwise defined, all terms including technical and scientific terms used herein have the same meaning as commonly understood by one of ordinary skill in the art to which the present disclosure belongs. It will be further understood that terms used herein should be interpreted as having a meaning that is consistent with their meaning in the context of this specification and the relevant art and will not be interpreted in an idealized or overly formal sense unless expressly so defined herein.

Hereinafter embodiments of a unit cell injection mold for a fuel cell according to the present disclosure will be described with reference to the accompanying drawings.

Figure 1:
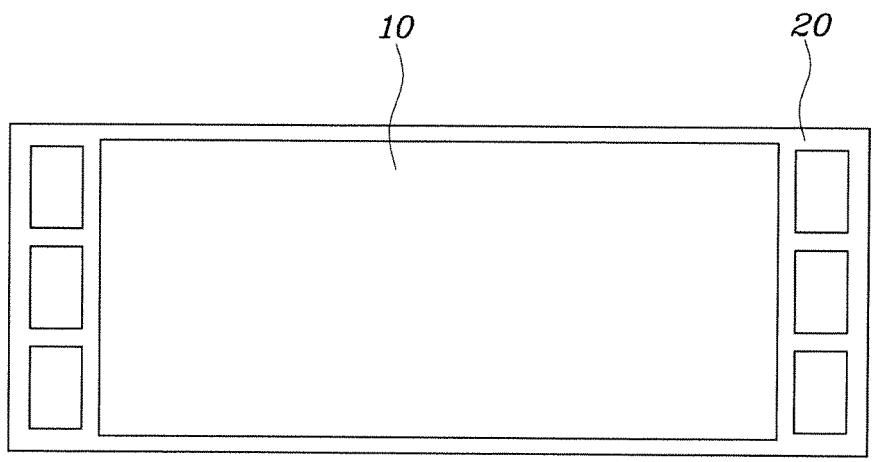
FIG. 1 is a view illustrating a unit cell of a fuel cell of the related art fabricated by integrating an MEA and a GDL.
Figure 2:
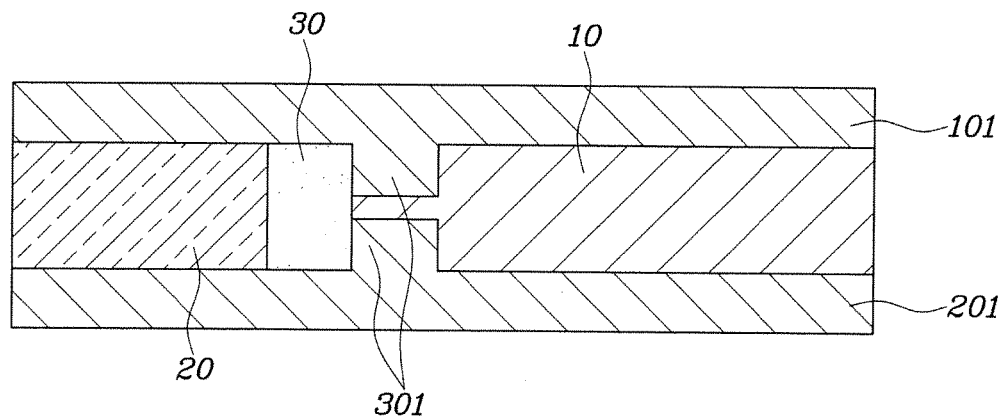
FIG. 2 is a view illustrating a unit cell injection mold for a fuel cell of the related art.
Figure 3:
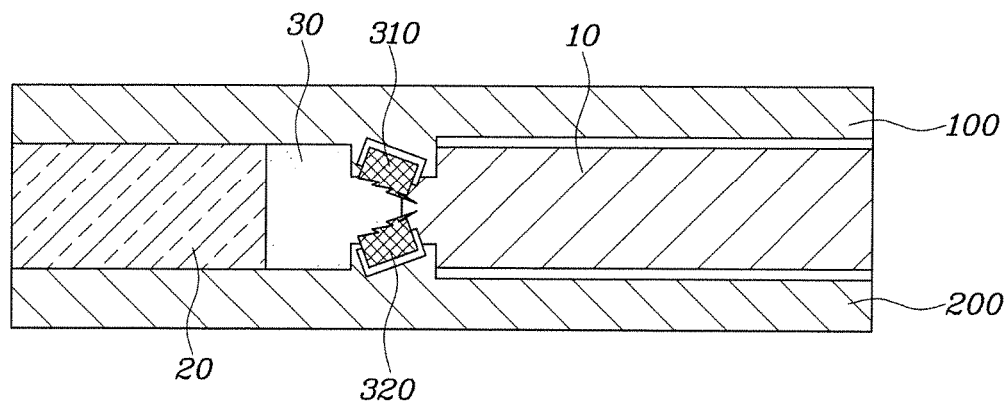
FIG. 3 is a view illustrating a unit cell injection mold for a fuel cell according to a first embodiment of the present disclosure.
Figure 4:
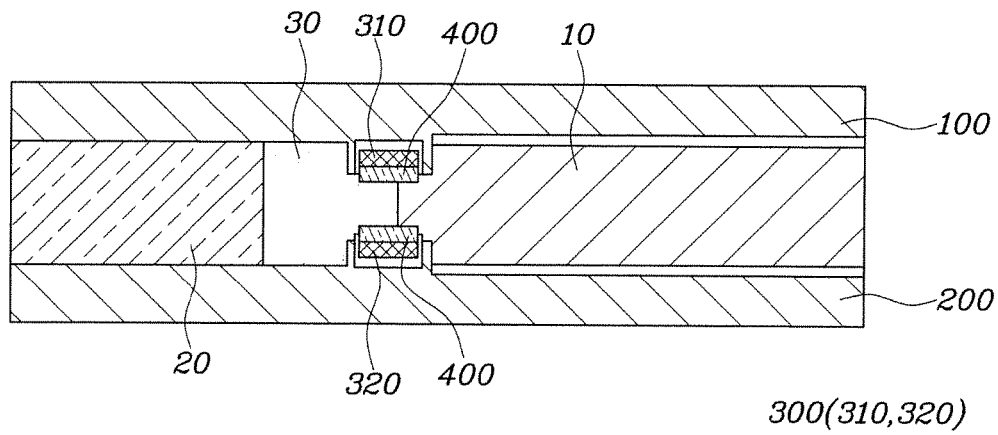
FIG. 4 is a view illustrating a unit cell injection mold for a fuel cell according to a second embodiment of the present disclosure.
Figure 5:
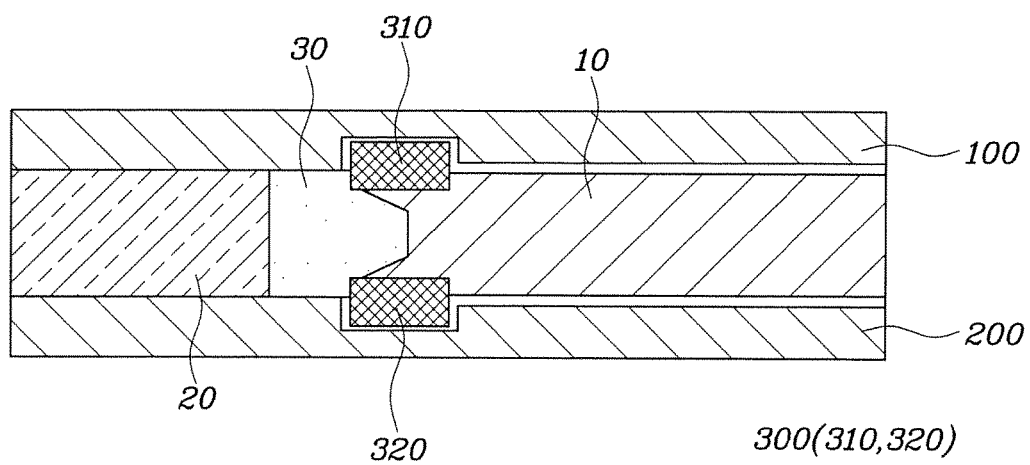
FIG. 5 is a view illustrating a unit cell injection mold for a fuel cell according to a third embodiment of the present disclosure.
Figure 6:
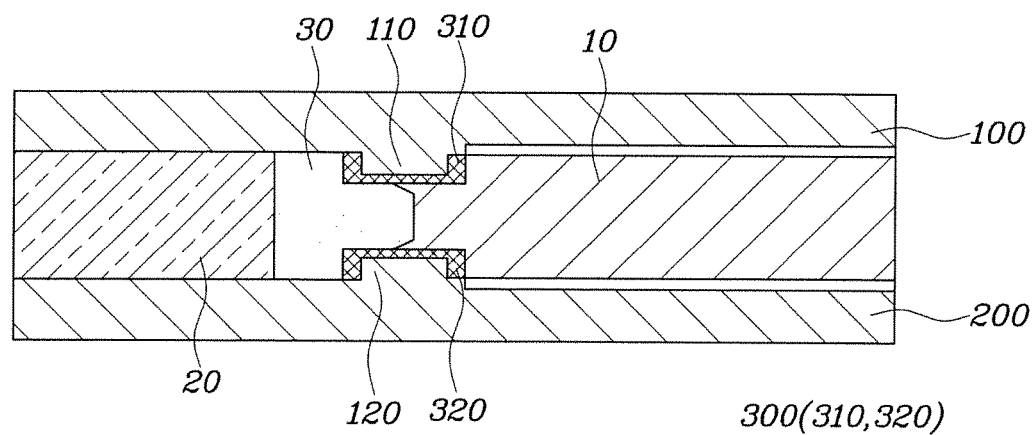
FIG. 6 is a view illustrating a unit cell injection mold for a fuel cell according to a fourth embodiment of the present disclosure.

FIG. 3 is a view illustrating a unit cell injection mold for a fuel cell according to a first embodiment of the present disclosure, FIG. 4 is a view illustrating a unit cell injection mold for a fuel cell according to a second embodiment of the present disclosure, FIG. 5 is a view illustrating a unit cell injection mold for a fuel cell according to a third embodiment of the present disclosure, and FIG. 6 is a view illustrating a unit cell injection mold for a fuel cell according to a fourth embodiment of the present disclosure.

As illustrated in FIGS. 3 to 6, the unit cell injection mold for a fuel cell according to an embodiment of the present disclosure is an injection mold for fabricating a unit cell of a fuel cell, whereby an integrated frame 20 may be formed by injecting a polymer resin 30 to the surroundings of an insert 10 into which a membrane electrode assembly (MEA) and a gas diffusion layer (GDL) are integrated. The injection mold may include an upper mold 100, a lower mold 200, and elastic protrusions 300 formed on the upper mold 100 and the lower mold 200 such that the protrusion 300 on the upper mold 100 faces the protrusion 300 on the lower mold 200.

The upper mold 100 and the lower mold 200 may be famed from a metallic material, and may define an inner space therebetween, the inner space consisting of an insert area, into which the insert 10 is fitted, and an injection area, into which the polymer resin 30 is injected into form the frame 20.

The insert area in the inner space defined by the upper mold 100 and the lower mold 200 may be formed thicker than the insert 10.

Thus, the insert 10 may be positioned at a small distance from the inner walls of the upper mold 100 and the lower mold 200, such that the insert 10 is prevented from contacting against the upper mold 100 or the lower mold 200, which may be hot. This can minimize heat transfer to the insert 10, thereby preventing the insert 10 from being damaged by heat of the upper mold 100 or of the lower mold 200.

The protrusions 300 according to an embodiment of the present disclosure may be able to clamp the insert 10 while dividing the inner space defined by the engagement of the upper mold 100 and the lower mold 200 into the insert area and the injection area, thereby preventing the polymer resin 30 from entering the insert area due to the pressure of injection during injection of the polymer resin.

In addition, the protrusions 300 according to an embodiment of the present disclosure may be formed from an elastic material. The protrusions 300 may be able to reliably clamp the insert 10, which may be formed from a relatively soft and smooth material, and may be able to prevent the insert 10 from being damaged, for example, fractured or cut, thereby minimizing defects in unit cell products of fuel cells.

As illustrated in FIG. 3, the elastic protrusions 300 according to the first embodiment of the present disclosure may include an upper elastic protrusion 310 and a lower elastic protrusion 320 engaged with the upper mold 100 and the lower mold 200, such that the upper elastic protrusion 310 and the lower elastic protrusion 320 are positioned between the insert area and the injection area. The distance between the upper elastic protrusion 310 and the lower elastic protrusion 320 may gradually decrease in the direction from the injection area to the insert area.

Such an arrangement and/or process may more effectively prevent the polymer resin 30 from entering the insert area during injection of the polymer resin 30, thereby improving the quality of unit cell products of fuel cells. Furthermore, it is possible to improve the quality of fuel cells fabricated by stacking unit cells.

Each of the upper elastic protrusion 310 and the lower elastic protrusion 320 according to an embodiment of the present disclosure may be formed to have a concave-convex structure on the surface that contacts against the insert 10 (i.e., the contacting surface), the concave-convex surface having a plurality of concave and convex portions formed thereon. Further, a plurality of clamping protrusions may be disposed on the concave-convex surface, at an incline in the direction from the injection area to the insert area.

It is thereby possible to more effectively prevent the polymer resin 30 from entering the insert area during injection of the polymer resin 30 while more effectively clamping the insert 10 such that the insert 10 is not pushed or slanted to one side.

As illustrated in FIG. 4, the unit cell injection mold for a fuel cell according to the second embodiment of the present disclosure may further include a pair of protective pads 400 attached to the upper elastic protrusion 310 and the lower elastic protrusion 320.

Here, all of the protective pads 400, the upper elastic protrusion 310, and the lower elastic protrusion 320 may be formed from an elastic rubber material in order to minimize damage to the insert 10 when the insert 10 is clamped.

The protective pads 400 according to the second embodiment of the present disclosure may be formed from a material having a higher degree of hardness than either the upper elastic protrusion 310 or the lower elastic protrusion 320. This is because, when the protective pads 400, which clamp the insert 10 while directly contacting against the insert 10, are formed from a smoother material than the upper elastic protrusion 310 and the lower elastic protrusion 320, damage to the insert 10 may be minimized.

In addition, the upper elastic protrusion 310 and the lower elastic protrusion 320 may be formed from a material, the heat resistance of which is greater than that of the protective pads 400, and the thermal conductivity of which is lower than that of the protective pads 400. Since the upper elastic protrusion 310 and the lower elastic protrusion 320 directly contact against the upper mold 100 and the lower mold 200, which are maintained at a high temperature, the upper elastic protrusion 310 and the lower elastic protrusion 320 having these characteristics can minimize heat transfer to the protective pads 400 and minimize deformation in the protective pads 400 caused by heat of the upper mold 100 and the lower mold 200, thereby minimizing deformation and damage to the protective pads 400, and furthermore, preventing the insert 10 from being damaged by heat.

As illustrated in FIG. 5, the upper mold 100 and the lower mold 200 according to the third embodiment of the present disclosure may be configured such that a pair of grooves, in which the upper elastic protrusion 310 and the lower elastic protrusion 320 can be fixedly seated, are formed between the insert area and the injection area. In this configuration, the upper elastic protrusion 310 and the lower elastic protrusion 320 formed from a rubber material can be accommodated in the grooves. In addition, as illustrated in FIG. 6, the upper mold 100 and the lower mold 200 according to the fourth embodiment of the present disclosure may be configured such that an upper protrusion 110 and a lower protrusion 210 protrude toward each other between the insert area and the injection area. In this configuration, the upper elastic protrusion 310 and the lower elastic protrusion 320, formed from the rubber material, can be attached to the upper mold 100 and the lower mold 200 to surround the upper protrusion 110 and the lower protrusion 210.

It is thereby possible to clamp the insert 10 by minimizing damage to the insert 10 while effectively preventing the polymer resin 30 from entering the insert area during injection thereof.

The elastic protrusions may be characterized in that the shape of the upper elastic protrusion differs from that of the lower elastic protrusion.

Figure 7:
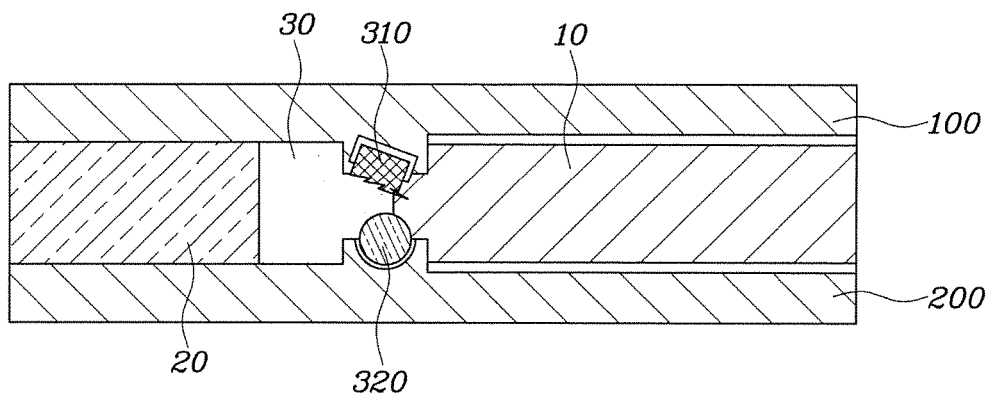
FIG. 7 is a view illustrating a unit cell injection mold for a fuel cell according to a fifth embodiment of the present disclosure.
Figure 8:
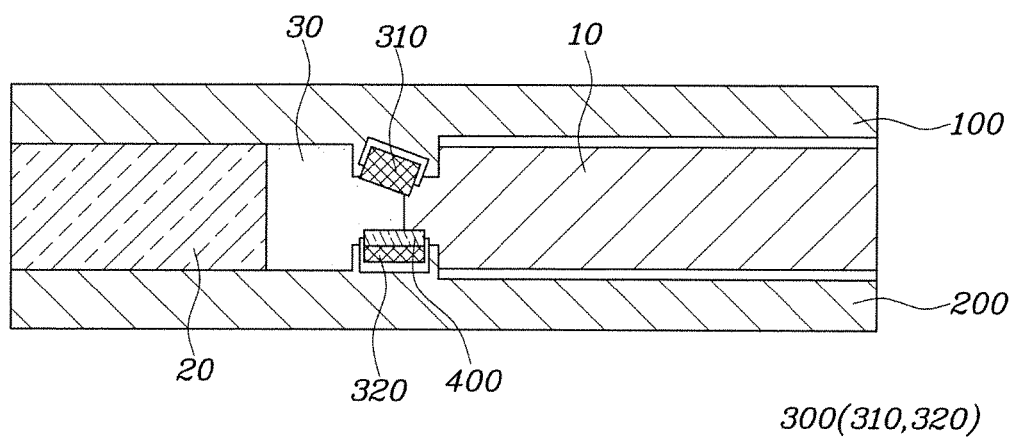
FIG. 8 is a view illustrating a unit cell injection mold for a fuel cell according to a sixth embodiment of the present disclosure.

FIG. 7 is a view illustrating a unit cell injection mold for a fuel cell according to a fifth embodiment of the present disclosure, and FIG. 8 is a view illustrating a unit cell injection mold for a fuel cell according to a sixth embodiment of the present disclosure.

As illustrated in FIGS. 7 and 8, in the unit cell injection mold for a fuel cell according to the fifth and sixth embodiments of the present disclosure, combinations of the upper elastic protrusion 310 and the lower elastic protrusion 320 having different shapes may be used.

For example, it is possible to employ a combination in which one of the upper elastic protrusion 310 and the lower elastic protrusion 320 of the elastic protrusions 300 has a hexagonal shape with a plurality of concave portions and a plurality of convex portions being formed on a contacting surface thereof (i.e., a concave-convex surface) and the other one of the upper elastic protrusion 310 and the lower elastic protrusion 320 of the elastic protrusions 300 has a cylindrical shape.

In addition, it is possible to employ a combination in which one of the upper elastic protrusion 310 and the lower elastic protrusion 320 is inclined and the other one of the upper elastic protrusion 310 and the lower elastic protrusion 320 is parallel to the mold.

Although the exemplary embodiments of the present disclosure have been described for illustrative purposes, a person skilled in the art will appreciate that various modifications, additions and substitutions are possible, without departing from the scope and spirit of the present disclosure as disclosed in the accompanying claims.

It should be therefore understood that the foregoing embodiments are illustrative in all aspects rather than restrictive. The scope of the present disclosure is represented by the accompanying claims rather than by the foregoing description of the embodiments. It should be interpreted that all modifications and alterations derived from the definition of the claims as well as the scope and equivalents thereof belong to the scope of the present disclosure.

What is claimed is:

1. A unit cell injection mold for fabricating a unit cell of a fuel cell, in which an integrated frame of the unit cell formed by injecting a polymer resin onto an insert, in which a membrane electrode assembly and a gas diffusion layer are integrated, is formed, the unit cell injection mold comprising:
- an upper mold;
- a lower mold engaged with the upper mold to define an inner space between the lower mold and the upper mold, the inner space including an insert area into which the insert is accommodated and an injection area into which the polymer resin is injected to form the frame; and
- elastic protrusions formed from an elastic material, the elastic protrusions being disposed on the upper mold and the lower mold to face each other, wherein the elastic protrusions clamp the insert to divide the inner space into the insert area and the injection area, and also to prevent the polymer resin from entering the insert area.

2. The unit cell injection mold according to claim 1, wherein the elastic protrusions include: an upper elastic protrusion fixed to the upper mold to be positioned between the insert area and the injection area; and
- a lower elastic protrusion fixed to the lower mold to face the upper elastic protrusion,
- wherein a distance between the upper elastic protrusion and the lower elastic protrusion gradually decreases in a direction from the injection area toward the insert area.

3. The unit cell injection mold according to claim 2, wherein each of the upper elastic protrusion and the lower elastic protrusion has a convex-concave structure on a surface thereof that contacts against the insert.

4. The unit cell injection mold according to claim 2, further comprising a pair of protective pads attached to the surface of the upper elastic protrusion and the surface of the lower elastic protrusion that contact against the insert.

5. The unit cell injection mold according to claim 4, wherein the upper elastic protrusion and the lower elastic protrusion are formed from a rubber material, a heat resistance of which is greater than that of the protective pads, and a thermal conductivity of which is lower than that of the protective pads.

6. The unit cell injection mold according to claim 4, wherein the upper elastic protrusion, the lower elastic protrusion, and the protective pads are formed from a rubber material, wherein the rubber material of the upper elastic protrusion and the lower elastic protrusion have a higher degree of hardness than the rubber material of the protective pads.

7. The unit cell injection mold according to claim 2, wherein the upper mold and the lower mold further comprise an upper protrusion and a lower protrusion between the insert area and the injection area, the upper protrusion facing the lower protrusion, and the upper elastic protrusion and the lower elastic protrusion are attached to the upper mold and the lower mold to surround the upper protrusion and the lower protrusion.

8. The unit cell injection mold according to claim 1, wherein the upper elastic protrusion and the lower elastic protrusion in the elastic protrusions have different shapes.

9. The unit cell injection mold according to claim 1, wherein a thickness of the insert area is greater than a thickness of the insert such that neither the upper mold nor the lower mold contacts the insert.

* * * * *